United States Patent
Staemmler et al.

(10) Patent No.: US 11,247,407 B2
(45) Date of Patent: Feb. 15, 2022

(54) METHOD FOR JOINING PLASTIC PARTS

(71) Applicant: GREINER BIO-ONE GMBH, Frickenhausen (DE)

(72) Inventors: Lutz Staemmler, Beuren (DE); Andreas Thumm, Reutlingen (DE)

(73) Assignee: GREINER BIO-ONE GMBH, Frickenhausen (DE)

( * ) Notice: Subject to any disclaimer, the term of this patent is extended or adjusted under 35 U.S.C. 154(b) by 0 days.

(21) Appl. No.: 16/965,435

(22) PCT Filed: Jan. 30, 2019

(86) PCT No.: PCT/EP2019/052295
§ 371 (c)(1),
(2) Date: Jul. 28, 2020

(87) PCT Pub. No.: WO2019/149779
PCT Pub. Date: Aug. 8, 2019

(65) Prior Publication Data
US 2021/0053298 A1 Feb. 25, 2021

(30) Foreign Application Priority Data
Jan. 30, 2018 (DE) ..................... 10 2018 201 349.7

(51) Int. Cl.
*B29C 65/00* (2006.01)
*B29C 65/10* (2006.01)
(Continued)

(52) U.S. Cl.
CPC .......... *B29C 66/543* (2013.01); *B29C 65/103* (2013.01); *B29C 65/1412* (2013.01);
(Continued)

(58) Field of Classification Search
CPC . B29C 66/543; B29C 66/0242; B29C 66/114; B29C 66/73921; B29C 66/91421;
(Continued)

(56) References Cited

U.S. PATENT DOCUMENTS 4,711,746 A * 12/1987 Drader .............. B05C 17/00536
156/244.11
4,715,911 A * 12/1987 Johansson ............... B29C 65/08
156/69

(Continued)

FOREIGN PATENT DOCUMENTS

| CN | 1225057 A | 8/1999 |
| CN | 101659334 A | 3/2010 |

(Continued)

OTHER PUBLICATIONS

International Search Report issued by the European Patent Office in relation to International Application No. PCT/EP2019/052295 dated May 13, 2019.

(Continued)

*Primary Examiner* — Daniel McNally
(74) *Attorney, Agent, or Firm* — Carter, DeLuca & Farrell LLP; George Likourezos

(57) ABSTRACT

The present invention relates to a method for producing a container which consists of a thermoplastic at least to some extent and comprises at least a first compartment element and at least a second compartment element joined to the first compartment element in a joining region by thermoplastic welding. The invention also relates to a plastic container which can be, and preferably is, produced according to said method.

22 Claims, 5 Drawing Sheets

(51) Int. Cl.
    *B29C 65/14*     (2006.01)
    *B29K 701/12*     (2006.01)
    *B29L 31/00*     (2006.01)

(52) U.S. Cl.
    CPC ...... *B29C 65/1425* (2013.01); *B29C 65/1445* (2013.01); *B29C 66/0242* (2013.01); *B29C 66/114* (2013.01); *B29C 66/73921* (2013.01); *B29C 66/91421* (2013.01); *B29K 2701/12* (2013.01); *B29L 2031/712* (2013.01)

(58) Field of Classification Search
    CPC .............. B29C 65/103; B29C 65/1412; B29C 65/1425; B29C 65/1445
    See application file for complete search history.

(56) References Cited

U.S. PATENT DOCUMENTS

| | | | |
|---|---|---|---|
| 5,298,713 A | * | 3/1994 | Marlin .................. B29C 65/10 219/121.46 |
| 6,857,534 B1 | | 2/2005 | Keller |
| 2009/0298164 A1 | * | 12/2009 | Cattadoris .............. C12M 23/24 435/294.1 |
| 2010/0038363 A1 | | 2/2010 | Kies et al. |
| 2014/0361461 A1 | | 12/2014 | Egger et al. |
| 2016/0185524 A1 | | 6/2016 | Goad |

FOREIGN PATENT DOCUMENTS

| | | |
|---|---|---|
| CN | 103785985 A | 5/2014 |
| CN | 104228094 A | 12/2014 |
| DE | 6945152 U | 2/1970 |
| DE | 3609775 A1 | 11/1986 |
| DE | 19532598 A1 | 3/1997 |
| DE | 10137054 A1 | 2/2003 |
| DE | 202009009762 U1 | 10/2009 |
| GB | 848967 C | 9/1960 |

OTHER PUBLICATIONS

International Preliminary Report on Patentability and Written Opinion issued by The Internation Bureau of WIPO in relation to International Applciaiton No. PCT/EP2019/052295, dated Aug. 13, 2020.

The First Office Action and Search Report issued by the China National Intellectual Property Administration (CNIPA) in connection with International Application No. 201980010853.4 dated Aug. 6, 2021.

* cited by examiner

METHOD FOR JOINING PLASTIC PARTS

CROSS-REFERENCE TO RELATED APPLICATIONS

This application is a national phase entry under 35 U.S.C. 371 of PCT International Application No. PCT/EP2019/052295 filed Jan. 30, 2019, which claims priority to German Patent Application No. 10 2018 201 349.7, filed Jan. 30, 2018, the disclosure of each of these applications is expressly incorporated herein by reference in their entirety.

Figure 1:
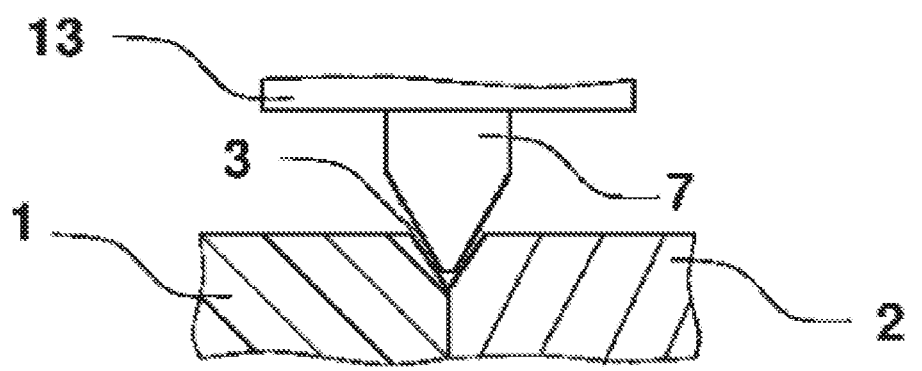
FIG. 1 shows a side view of the immergence of the temperature-controlled. nozzle into the joining zone located between two compartment elements, in accordance with the disclosure.

This invention relates to a method for producing a container which is at least partially constructed from a thermoplastic material, comprising at least one first compartment element and at least one second compartment element which is thermoplastically welded to the first in a joining region, as well as a plastic container that can be, and preferably is, produced according to the method according to the invention.

A particular challenge in the production of containers made of thermoplastic material is the solid, in particular residue-free, joining of several plastic elements forming the container. At present, various state-of-the-art methods are used for welding plastic parts.

So-called laser welding is based on the fact that two different plastics are used, one of which is transparent to the laser and the other which absorbs the energy of the laser, so that the thermoplastic is heated locally and a weld is produced between the individual plastic parts by applying joining pressure.

In the so-called ultrasonic method, certain parts of the plastic are heated in a targeted manner by ultrasound, so that a joining of the heated thermoplastic parts takes place under joining pressure. A particular disadvantage of this method is the risk of particle formation.

A further possibility of joining individual plastic elements together is to bond the individual elements of the plastic container to each other, which, however, has the disadvantage that residues of the adhesive, or the solvent used, remain at the joining point, thus considerably limiting the scope of application of a container produced in this way.

In hot plate, hot gas or rotation welding, thermoplastic parts are initially plasticized by heating and subsequently joined together by applying joining pressure. Hot plate welding involves contact of at least one of the two thermoplastic parts to be welded with a heating element, whereby the joining surface is plasticized locally. Subsequently, in a second step, the plastic parts to be welded are then joined by applying a joining pressure. In contrast to hot plate welding, in hot gas welding, the joining surface of at least one of the plastic parts to be welded is plasticized locally by means of a hot gas stream. In this method too, the plastic parts are joined by applying a joining pressure. In rotation welding, the plasticizing of the plastic is achieved by frictional heat, which is generated when the plastic part that is to be welded to rotates on a second plastic part that is locked against rotation. In the region of the contacting joining surfaces, the plastic parts to be joined are thus melted and are firmly joined together by the pressure applied.

DE 3609775 A1 relates to a device for integral joining of thermoplastic material, at least in the region of the joining points. The device comprises a heat and/or microwave radiating element and a feed nozzle, via which plasticized plastic is fed into the contact region of the two plastic parts, whereby the plastic parts, which are thermoplastic at least in the region of the joints, are integrally joined with each other.

The task of the joining here is to provide a method for the production of a container which is at least partially constructed from a thermoplastic material, in which method the disadvantages of the joining methods known in the state of the art are overcome, so that welding of the individual plastic parts forming the container occurs, advantageously without the necessity of applying a joining pressure, in particular welding of the individual plastic parts forming the container in an adhesive, solvent and particle-free manner.

This invention solves the underlying technical problem, in particular, by the subject matter of the independent claims.

The invention relates, in particular, to a method for producing a container which is at least partially constructed from a thermoplastic material, comprising at least one first compartment element and at least one second compartment element which is thermoplastically welded to the first in a joining region, wherein the method comprises the following method steps:

a) Provision of at least one first and one second compartment element, which each comprise a plate element with at least one joining zone of a thermoplastic material comprising the outer edges of the compartment element, wherein at least the second compartment element comprises a side wall arranged around the outer periphery of the plate element and having in each case a distal first and proximal second outer edge, b) Joining together of the at least two compartment elements such that the thermoplastic material joining zones contact each other and one outer edge of the first compartment element fully abuts the first outer edge of the second compartment element and a full butt joint is formed between the two compartment elements, c) Welding of the at least two compartment elements by means of at least one temperature-regulated nozzle, wherein the at least one nozzle is guided around the periphery of the butt joint while in contact with the butt joint or the butt joint is guided alongside the at least one nozzle that is in contact with the at least one nozzle, wherein the respective first and second outer edges of the compartment elements are plasticized in the process and plasticized welding filler is simultaneously transferred to the butt joint so that a weld seam is formed between the two compartment elements, and d) Obtaining a plastic container, wherein the at least two compartment elements are welded to one another.

In a preferred embodiment of this invention, the first compartment element is a plate element. According to this embodiment, the second compartment element comprises a plate element and a side wall arranged around the outer periphery of the plate element, respectively having a distal first and a proximal second outer edge arranged parallel to the plate element.

In a further preferred embodiment of this invention, the first and/or second compartment element comprises a side wall arranged around the outer periphery of the plate element with respectively a distal first and a proximal second outer edge arranged parallel to the plate element. Preferably, the side wall of the first and/or second compartment element is arranged around the outer periphery of the plate element orthogonal to the plane formed by the plate element. Preferably, the plane formed by the plate element is parallel to the planes formed by the distal first and the proximal second outer edges. Preferably, the distance between the plane formed by the plate element and the plane formed by the distal first outer edge is greater than the distance between the plane formed by the plate element and the plane formed by the proximal second outer edge. Preferably, the distance of the plane formed by the plate element to the plane formed by the distal first outer edge is smaller than the distance of the plane formed by the plate element to the plane formed by the proximal second outer edge. Preferably, the distance of the plane formed by the plate element to the plane formed by the distal first outer edge is identical to the distance of the plane formed by the plate element to the plane formed by the proximal second outer edge.

In a preferred embodiment of this invention, the side wall of a compartment element has a height of 2 to 200 mm, preferably 2 to 180 mm, preferably 2 to 160 mm, preferably 2 to 140 mm, preferably 2 to 120 mm, preferably 2 to 100 mm, preferably 2 to 80 mm, preferably 2 to 60 mm, preferably 4 to 40 mm, preferably 4 to 30 mm, preferably 4 to 25 mm, preferably 4 to 20 mm, preferably 4 to 18 mm, preferably 4 to 16 mm, preferably 6 to 14 mm, preferably 6 to 12 mm, preferably 8 to 12 mm, preferably 10 mm. Preferably, the height of the side wall of a compartment element is at least 2 mm, preferably at least 4 mm, preferably at least 6 mm, preferably at least 8 mm, preferably at least 10 mm.

In another preferred embodiment of this invention, the side walls of the individual compartment elements have different heights. Preferably, all side walls of the individual compartment elements have the same height.

In a preferred embodiment of this invention, the side wall of a compartment element has a thickness of 0.1 to 10 mm, preferably 0.1 to 9 mm, preferably 0.2 to 8 mm, preferably 0.3 to 7 mm, preferably 0.4 to 6 mm, preferably 0.5 to 5 mm, preferably 0.6 to 4.5 mm, preferably 0.7 to 4 mm, preferably 0.8 to 3.5 mm, preferably 1 to 3 mm, preferably 1.25 to 2.5 mm, preferably 1.5 to 2.5 mm, preferably 1.75 to 2.25 mm, preferably 2 mm. Preferably, the thickness of the side wall of a compartment element is at least 0.1 mm, preferably at least 0.2 mm, preferably at least 0.3 mm, preferably at least 0.4 mm, preferably at least 0.5 mm, preferably at least 0.6 mm, preferably at least 0.7 mm, preferably at least 0.8 mm, preferably at least 0.9 mm, preferably at least 1 mm.

In another preferred embodiment of this invention, the side walls of the individual compartment elements have different thicknesses. Preferably, all side walls of the individual compartment elements have the same thickness.

In a preferred embodiment of this invention, the plate element of the at least two compartment elements is square, rectangular, oval, or round. Preferably, the plate element of the at least two compartment elements is square. Preferably, the plate element of the at least two compartment elements is rectangular. Preferably, the plate element of the at least two compartment elements is oval. Preferably, the plate element of the at least two compartment elements is round.

In a preferred embodiment of this invention, at least one further compartment element is provided in method step a), in method step by the further compartment element is completely joined with its first outer edge to the second outer edge of the second or a possibly present further compartment element and in method step c), the butt joint formed between the joined compartment elements is welded.

In a preferred embodiment of this invention, each further compartment element comprises a plate element and a side wall arranged around the outer periphery of the plate element, respectively with a distal first and proximal second outer edge arranged parallel to the plate element.

In a preferred embodiment of this invention, the compartment elements are joined to one another in a rotationally secure manner in method step b).

In a preferred embodiment of this invention, at least one compartment element and the welding filler are made of the same materials, preferably, of the same material.

In a preferred embodiment of this invention, the welding filler is plasticized by the at least one temperature-controlled nozzle. Preferably, the welding filler is plasticized in the at least one temperature-controlled nozzle.

In a preferred embodiment of this invention, the temperature of the at least one temperature-regulated nozzle is 150 to 320° C., preferably 160 to 310° C., preferably 170 to 300° C., preferably 180 to 290° C., preferably 190 to 280° C., preferably 200 to 275° C., preferably 210 to 270° C., preferably 220 to 265° C., preferably 225 to 260° C., preferably 230 to 255° C., preferably 235 to 250° C., preferably 240 to 250° C. Preferably, the temperature of the at least one temperature-controlled nozzle is at least 150° C., preferably at least 160° C., preferably at least 170° C., preferably at least 180° C., preferably at least 190° C., preferably at least 200° C., preferably at least 210° C., preferably at least 220° C., preferably at least 230° C., preferably at least 240° C., preferably at least 250° C. At the same time, the temperature of the at least one temperature-regulated nozzle that is set depends on the specific melting temperature of the at least one thermoplastic material selected in the method according to the invention, and is selected in such a way that, by contacting the at least one temperature-regulated nozzle with the butt joint formed between the at least two compartment elements, plasticization of the respective first and second outer edges in the region of the joining zones of the compartment elements occurs, and at the same time plasticized welding filler can be transferred on to the butt joint through the at least one temperature-regulated nozzle.

In a preferred embodiment of this invention, the at least one thermoplastic material is polystyrene and the temperature of the at least one temperature-controlled nozzle is 225 to 240° C., preferably 230 to 235° C. In another preferred embodiment, the at least one thermoplastic material is polyurethane and the temperature of the at least one temperature-controlled nozzle is 200 to 240° C., preferably 205 to 235° C., preferably 220° C. In another preferred embodiment, the at least one thermoplastic material is polyethylene terephthalate and the temperature of the at least one temperature-controlled nozzle is 205 to 255° C., preferably 210 to 250° C., preferably 230° C. In a further preferred embodiment, the at least one thermoplastic material is acrylonitrile butadiene styrene and the temperature of the at least one temperature-controlled nozzle is 235 to 265° C., preferably 240 to 260° C., preferably 250° C. In a further preferred embodiment, the at least one thermoplastic material is polyamide and the temperature of the at least one temperature-controlled nozzle is 235 to 265° C., preferably 240 to 260° C., preferably 250° C. In another preferred embodiment, the at least one thermoplastic material is polypropylene and the temperature of the at least one temperature-controlled nozzle is 245 to 275° C., preferably 250 to 270°

C., preferably 260° C. In another preferred embodiment, the at least one thermoplastic material is low-density polyethylene (LDPE) and the temperature of the at least one temperature-controlled nozzle is 155 to 265° C., preferably 160 to 260° C., preferably 180 to 240° C., preferably 200 to 220° C., preferably 210° C. In another preferred embodiment, the at least one thermoplastic material is high-density polyethylene (HDPE) and the temperature of the at least one temperature-controlled nozzle is 255 to 305° C., preferably 260 to 300° C., preferably 280° C.

In a preferred embodiment of this invention, the connecting zones of the at least two compartment elements consist of a material comprising one or more thermoplastics selected from the group consisting of polystyrene, polypropylene, polycarbonate, polyethylene terephthalate and polyethylene.

In a further preferred embodiment, at least one of the at least two compartment elements is made of a material comprising one or more thermoplastics selected from the group consisting of polystyrene, polypropylene, polycarbonate, polyethylene terephthalate and polyethylene.

In a preferred embodiment of this invention, the material of the welding filler is one or more thermoplastics selected from the group consisting of polystyrene, polypropylene, polycarbonate, polyethylene terephthalate and polyethylene.

In a further preferred embodiment of this invention, at least one of the at least two compartment elements and the welding filler are made of the same material. Preferably, at least one of the at least two compartment elements and the welding filler consist of one or more thermoplastics selected from the group consisting of polystyrene, polypropylene, polycarbonate, polyethylene terephthalate and polyethylene.

In a further preferred embodiment of this invention, the welding filler is fed to the at least one nozzle in the form of granulate or a continuous strand. Preferably, the welding filler in the form of granulate is fed to the at least one nozzle. The welding filler is preferably fed to the at least one nozzle in the form of a continuous strand, preferably in the form of a welding wire.

In a preferred embodiment of this invention, in a further method step b') the compartment elements are preheated in the region of the butt joint in a further method step b'). Preferably, method step b') follows the preheating by hot air, infrared and/or microwave radiation of the compartment elements in the region of the butt joint.

In a preferred embodiment of this invention, the weld seam is heated in a further method step c'). In method step c), the weld seam is preferably heated by hot air, infrared and/or microwave radiation.

In a preferred embodiment of this invention, by the abutting of the compartment elements in method step by at least one depression is formed in the region of the butt joint between the compartment elements.

In a preferred embodiment of this invention, the welding of the at least two compartment elements is carried out by means of at least one temperature-regulated nozzle in method step c), wherein the at least one nozzle is guided around the periphery of the butt joint while in contact with the butt joint, and plasticized welding filler is simultaneously transferred to the butt joint so that a weld seam is formed between the two compartment elements.

In a further preferred embodiment, the welding of the at least two compartment elements is carried out by means of at least one temperature-regulated nozzle in method step c), wherein the butt joint is guided alongside the at least one nozzle that is in contact with the at least one nozzle, and plasticized welding filler is simultaneously transferred onto the butt joint so that a weld seam is formed between the two compartment elements.

Preferably, the welding of the at least two compartment elements is carried out by means of at least one temperature-regulated nozzle in method step c), in this way the butt joint and the at least one nozzle are moved relative to one another in contact with one another and at the same time plasticized welding filler is transferred on to the butt joint so that a weld seam is formed between the two compartment elements.

In another preferred embodiment of this invention, the at least one temperature-regulated nozzle has a diameter of 0.3 to 2 mm, preferably 0.3 to 1.3 mm, preferably 0.4 to 1.6 mm, preferably 0.4 to 1.4 mm, preferably 0.5 to 1.2 mm, preferably 0.5 to 1 mm, preferably 0.5 to 0.8 mm. The use of at least one temperature-regulated nozzle with a small nozzle diameter makes it possible, advantageously, for the weld seam formed between the compartment elements in step c) to have a particularly small width.

In a preferred embodiment of this invention, the width of the weld seam formed between the compartment elements in step c) is preferably less than 5 mm, preferably less than 4.5 mm, preferably less than 4 mm, preferably less than 3.5 mm, preferably less than 3 mm, preferably less than 2.5 mm, preferably less than 2 mm.

In a preferred embodiment of this invention, in method step c), at least three, preferably at least four, preferably at least five, preferably at least six, preferably all compartment elements provided in method step a) and joined together in method step b) are simultaneously welded together. Preferably, at least three, preferably at least four, preferably at least five, preferably at least six, preferably all the compartment elements provided in method step a) and joined together in method step b) are welded together in succession in method step c), In a preferred embodiment of this invention, the at least one temperature-regulated nozzle is completely or partially immerged into the at least one depression in method step c). In method step c), the at least one temperature-regulated nozzle is preferably immerged completely into the at least one depression. In method step c) the at least one temperature-controlled nozzle is preferably partially immerged into the at least one depression. In this embodiment, the at least one temperature-regulated nozzle contacts the two compartment elements forming the depression, in particular the two outer edges of the compartment elements forming the depression, during complete or partial immergence into the at least one depression. As a result of the contact, the thermoplastic material of the compartment elements melts in the joining region, the depression being at least partially, preferably completely, filled with the welding filler through the at least one temperature-regulated nozzle, resulting in the welding of the compartment elements, in particular in an adhesive, solvent and particle-free manner.

In a preferred embodiment of this invention, the compartment elements are suitable for the cultivation and/or examination of cells. Preferably, at least one compartment element is suitable for the cultivation and/or examination of cells. Preferably at least one compartment element is a cell culture dish.

In a preferred embodiment of this invention, the plastic container obtained in step d) comprises at least two, preferably at least three, preferably at least four, preferably at least five, preferably at least six, preferably at least seven, preferably at least eight, preferably at least nine, preferably at least ten, preferably at least 20, preferably at least 30, preferably at least 40, preferably at least 50, preferably at least 100, preferably at least 200, compartment elements which are welded together. Preferably the plastic container obtained in step d) comprises 2 to 20, preferably 2 to 18, preferably 2 to 16, preferably 2 to 14, preferably 2 to 12, preferably 2 to 10, preferably 4 to 10, preferably 4 to 8, preferably 4 to 6, compartment elements which are welded to one another.

In a preferred embodiment of this invention, the at least one compartment element has a connecting, preferably central, channel. Preferably, the at least one compartment element has a connecting, preferably central, channel as a supply channel for cell culture medium. Preferably, each of the compartment elements has a connecting, preferably central, channel. Preferably, each of the compartment elements has a connecting, preferably central, channel as a supply channel for cell culture medium.

In a preferred embodiment of this invention, at least one compartment element has a disposal channel. Preferably at least one compartment element has a disposal channel for depleted cell culture medium.

In a preferred embodiment of this invention, a substance exchange, preferably a gas and/or a liquid exchange, between individual compartment elements is possible. A substance exchange, preferably gas and/or liquid exchange, is preferably possible between all compartment elements.

In a preferred embodiment of this invention, at least one, preferably exactly one, compartment element has at least one closable, preferably reclosable, opening. In a preferred embodiment of this invention, at least one opening has a thread, preferably an external thread. Preferably, the at least partially thermoplastic container can be filled and emptied via the at least one opening.

This invention also relates to a plastic container comprising at least two compartment elements that can be, and preferably is, produced according to the method according to the invention.

In a preferred embodiment, the plastic container comprising at least two compartment elements is a cell culture vessel.

Preferably the plastic container comprising at least two compartment elements is a cell culture vessel which is constructed from at least one cell culture dish.

In a preferred embodiment, the statements made in connection with the method according to the invention apply mutatis mutandis to the plastic container as such, which can be, and preferably is, produced according to the method according to the invention.

In the context of this invention, a "side wall" is understood to be a wall of a compartment element enclosing an open or closed hollow space. The respective side walls of the at least two compartment elements can form the side wall of the plastic container according to the invention. The side wall of a compartment element thereby has a distal first and a proximal second outer edge, wherein the two outer edges each lie in a plane parallel to the plane formed by the plate element. If the first or second compartment element does not have a side wall, then the first or second compartment element is a plate element, the outer edges of this first or second plate element therefore correspond to the distal first and proximal second outer edge of a side wall.

In the context of this invention, the term "compartment element" is understood to mean a single structural unit of the container which is at least partially constructed of a thermoplastic material. The compartment element can either be a plate element or comprise a plate element and a side wall arranged around the outer periphery of the plate element. If the first compartment element is a plate element, at least the second compartment element comprises a plate element and a side wall arranged around the outer periphery of the plate element.

In the context of this invention, "plate element" is understood to be that part of a compartment element which either itself has a distal first and a proximal second outer edge or has a side wall around its outer periphery, which side wall comprises a distal first and a proximal second outer edge arranged parallel to the plate element.

In the context of this invention, "distal" outer edge is defined as the outer edge of the side wall arranged around the outer periphery of the plate element, which outer edge lies further away from the plane formed by the plate element.

Correspondingly, the "proximal" outer edge is understood to be the outer edge of the side wall arranged around the outer periphery of the plate element which is closer to the plane formed by the plate element. If the first and second outer edges are equidistant from the plane formed by the plate element, the "distal" outer edge is the outer edge of the plate element itself or, if present, the side wall around the outer perimeter of the plate element, which is further away from the plane formed by the plate element of the next compartment element.

The term "joining zone" is used in the invention to describe the region of a compartment element in which the joining of at least two compartment elements takes place. In accordance with the invention, the joining zone consists of a thermoplastic material so that plasticization of the compartment element takes place in this region by contact with the at least one temperature-controlled nozzle. The connecting zones of a compartment element comprise a distal first outer edge consisting of thermoplastic material and a proximal second outer edge consisting of thermoplastic material. Typically, each compartment element thus has two joining zones. However, if the first or second compartment element is a plate element, it may also only comprise one joining zone.

The term "and/or" in the context of this invention means that all members of a group that are connected by the term "and/or" are disclosed, both alternatively to each other as well as also cumulatively with each other in any combination. This means for the term "A, B and/or C" that the following disclosure content is to be understood as: A or B or C, or (A and B) or (A and C) or (B and C) or (A and B and C).

In the context of this invention, the term "comprising" means that in addition to the elements explicitly covered by the term, other elements not explicitly mentioned may be added. In the context of this invention, this term also means that only the explicitly mentioned elements are covered and that there are no further elements. In this particular embodiment, the meaning of the term "comprising" is synonymous with the term "consisting of". In addition, the term "comprising" also covers entire units which, in addition to the explicitly mentioned elements, also contain other elements not mentioned, but which are of a subordinate functional and qualitative nature. In this embodiment, the term "comprising" is synonymous with the term "substantially consisting of".

Further advantageous embodiments of the invention result from the subclaims.

This invention will be explained in more detail below by means of the figures and the embodiment example.

FIG. 1 shows the immergence of the temperature-controlled nozzle 7 into the joining zone 3 located between two compartment elements 1 and 2, whereby the two compartment elements 1 and 2 are plasticized in the region of the joining zone 3.

Figure 2:
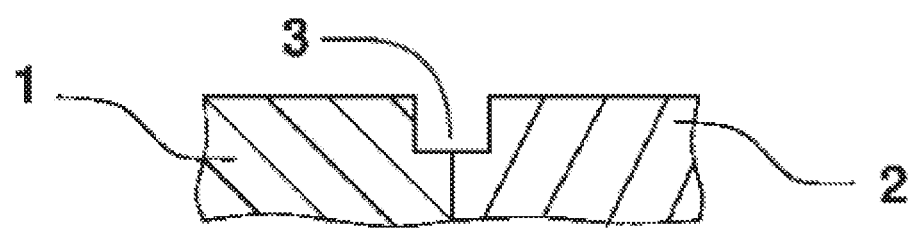
FIG. 2 shows a side view of an alternative geometry of the design of the joining zone in accordance with the disclosure.

An alternative geometry of the design of the joining zone 3 is shown in FIG. 2. A groove is formed between the compartment elements 1 and 2 in the region of joining zone 3. The advantage of such a groove is that plasticized welding filler can be introduced more freely between the plasticized compartment elements 1 and 2, as a hollow space is created in the region directly in front of the nozzle outlet. The welding filler can be metered into this hollow space.

Figure 3:
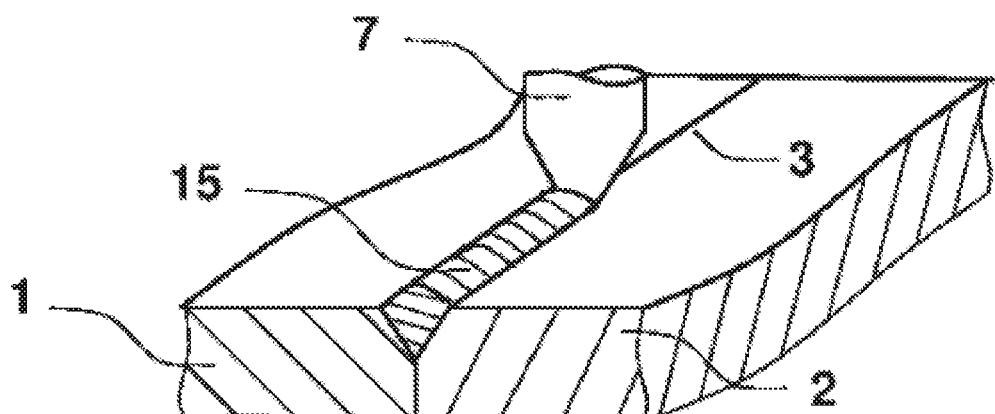
FIG. 3 is a perspective view of a weld seam, in accordance with the disclosure.

The design of the weld seam is shown in FIG. 3. While the temperature-regulated nozzle 7 plasticizes the two compartment elements 1 and 2 along the joining zone 3, plasticized welding filler 8 is simultaneously applied to the plasticized joining zone 3. This causes the compartment elements 1 and 2 plasticized in the region of joining zone 3 by the temperature-controlled nozzle 7 to fuse with the welding filler 8, so that after cooling a solid weld seam 15 is formed.

Figure 4:
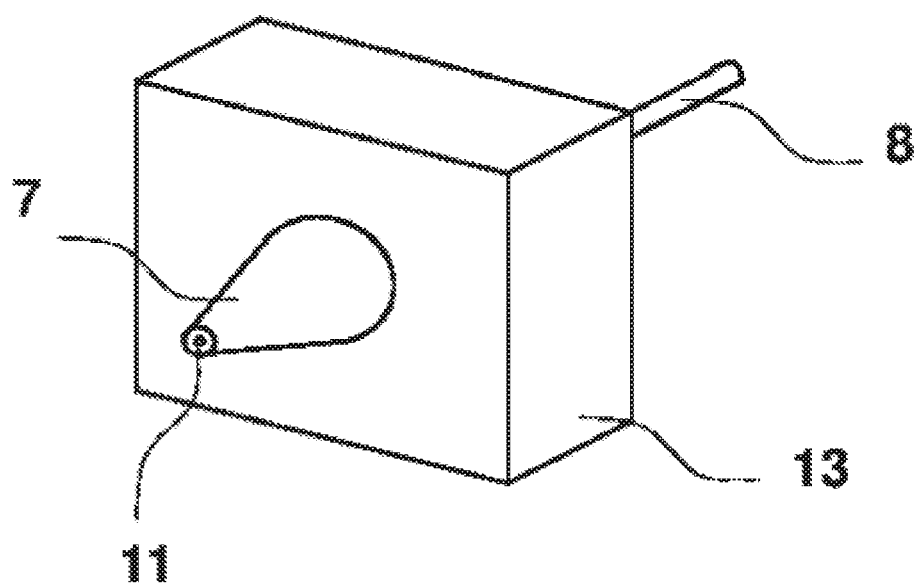
FIG. 4 is a perspective view of the nozzle of FIG. 1, in accordance with the disclosure.

FIG. 4 shows the design of the temperature-regulated nozzle 7. The nozzle tapers downwards towards the nozzle outlet 11 in order to heat the joining zone 3 in a targeted manner between two compartment elements and to place the welding filler 8 there.

Figure 5:
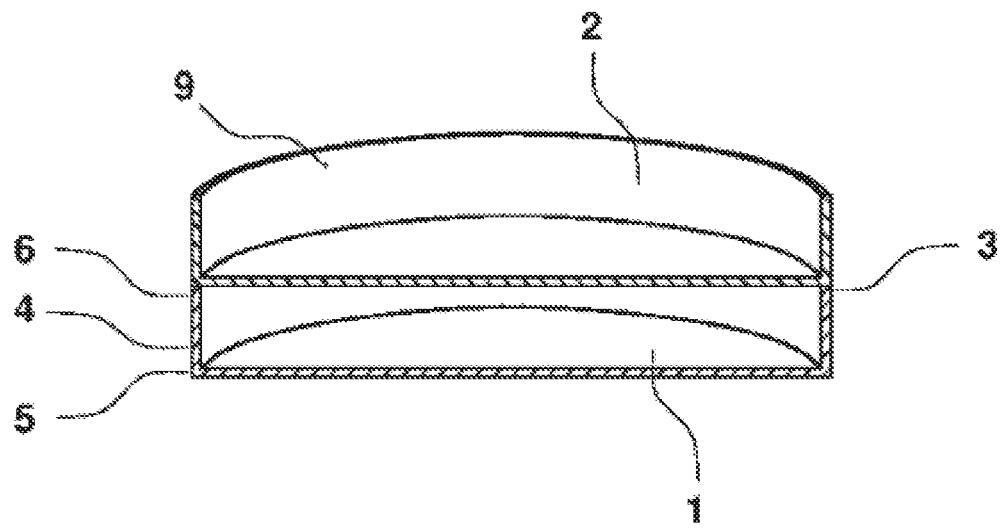
FIG. 5 is a side cutaway view of a plastic container produced by the method, in accordance with the disclosure.

FIG. 5 shows a plastic container 9 produced by the method according to this invention and consisting of two compartment elements 1 and 2. Compartment element 1 is shown, comprising a distal first outer edge 6 and a proximal second outer edge 5 of the side wall 4, which was welded to a second compartment element 2 in the region of the joining zone 3.

EXAMPLE:

A temperature controlled nozzle 7 suitable for welding at least two compartment elements according to the method of the invention is shown in FIG. 4. Nozzle 7 is screwed into a heating block 13. This heating block 13 is controlled to a desired temperature, e.g. by a heating cartridge and a sensor. The temperature of the heating block 13 is transferred to the nozzle 7 by thermal conduction, so that the nozzle 7 is operated in a temperature-controlled manner. The welding filler 8 is fed from the rear of the nozzle. It is hereby possible to supply welding filler 8 in the form of a welding wire. The advantage of using welding filler 6 as welding wire is that welding wire, with a diameter of 1.75 mm or 2.85 mm, is commonly also used in 3D printing and is therefore available as a standard product. Welding filler in the form of welding wire can be fed or retracted by a motor in combination with a knurled screw. This enables precise dosing. Alternatively, it is also possible to, for example, use granulate. When using granulate, the provisioning and apportioning of the welding filler 8 to the nozzles 7 is more flexible. This is particularly important if several welds are performed in parallel, i.e. if several nozzles have to be supplied with welding filler at the same time. In the method example described here, a nozzle 7 with a front opening 11 with a diameter of 0.5 mm to 1 mm is used. This allows a weld seam 15 of approx. 2 mm width. Other opening 11 diameters change the width of the weld seam 15, as well as the strength of the weld.

In the case of a cylindrical plastic container shown in FIG. 5, the temperature-controlled nozzle 7 can be moved to the joining zone 3 to plasticize it. At the same time, the temperature-controlled nozzle 7 doses the welding filler 8 around the periphery of the cylindrical plastic container 9, between the compartment elements 1 and 2. In a simple embodiment of this invention, the cylindrical plastic container 9 rotates around its own axis while the nozzle 7 remains stationary.

In the case of plastic containers which do not have a cylindrical shape, the temperature-regulated nozzle 7 must be guided along the connecting zone 3 formed between two compartment elements. This can be achieved, for example, with a 3-axis system similar to a 3D printer or milling machine. The use of articulated arm or hexapod systems is also conceivable.

The invention claimed is:

1. A method for producing a container which is at least partially constructed from a thermoplastic material, comprising at least one first compartment element and at least one second compartment element which is thermoplastically welded to the first in a joining region, wherein the method comprises the following method steps:
   a) providing of at least one first and one second compartment element, which each comprise a plate element with at least one joining zone of a thermoplastic material comprising outer edges of the compartment element, wherein at least the second compartment element comprises a side wall arranged around an outer periphery of the plate element having in each case a distal first d a proximal second outer edge,
   b) joining together of the at least two compartment elements such that the thermoplastic material joining zones contact each other and one outer edge of the first compartment element fully abuts the first outer edge of the second compartment element and a full butt joint is formed between the two compartment elements,
   c) welding of the at least two compartment elements by means of at least one temperature-regulated nozzle, wherein the at least one nozzle is guided around a periphery of the butt joint while in contact with the butt joint or the butt joint is guided alongside the at least one nozzle that is in contact with the at least ne nozzle, wherein the first and second outer edges of the compartment elements are plasticized in the process and plasticized welding filler is simultaneously transferred to the butt joint so that a weld seam is formed between the two compartment elements, and
   d) obtaining a plastic container, wherein the at least two compartment elements are welded to one another.

2. The method according to claim 1, wherein the compartment elements are suitable for the cultivation and/or investigation of cells.

3. The method according to either claim 2, wherein the at least one compartment element has a connecting channel as a supply channel for cell culture medium.

4. The method according to claim 3, wherein at least one compartment element has a disposal channel for used cell culture medium.

5. The method according to claim 2, wherein at least one compartment element is a cell culture dish.

6. The method according to claim 1, wherein in a further method step b') the compartment elements in the region of the butt joint are preheated.

7. The method according to claim 6, wherein in method step b') the compartment elements in the region of the butt joint are preheated by hot air, infrared and/or microwave radiation.

8. The method according to claim 1, wherein in a further method step c') the weld seam is heated.

9. The method according to claim 8, wherein in method step c') the weld seam is heated by hot air, infrared and/or microwave radiation.

10. The method according to claim 1, wherein at least one depression is formed in the region of the butt joint between the compartment elements by the abutting of the compartment elements in method step b).

11. The method according to claim 10, wherein the at least one temperature regulated-nozzle in method step c) is fully or partially immerged into the at least one depression.

12. The method according to claim 1, wherein the first compartment element comprises a side wall arranged around the outer periphery of the plate element and having a distal first and proximal second outer edge arranged parallel to the plate element.

13. The method according to claim 1, wherein, in method step a), at least one further compartment element is provided, in method step b), the further compartment element is fully joined with its first outer edge to the second outer edge of the second or any further compartment element present, and in method step c) the butt joint formed between the joined compartment elements is welded.

14. The method according to claim 13, wherein each further compartment element comprises a plate element and a side wall arranged around the outer periphery of the plate element and having respectively a distal first and proximal second outer edge arranged parallel to the plate element.

15. The method according to claim 1, wherein, in method step b), the compartment elements are joined together in a rotationally secure manner with respect to each other.

16. The method according to claim 1, wherein at east one compartment element and the welding filler consist of the same materials.

17. The method according to claim 1, wherein the at least one nozzle plasticizes the welding filler.

18. The method according to claim 1, wherein at least one of the at least two compartment elements consists of a material comprising one or more thermoplastics selected from the group consisting of polystyrene, polypropylene, polycarbonate, polyethylene terephthalate and polyethylene.

19. The method according to claim 1, wherein the material of the welding filler is one or more thermoplastics selected from the group consisting of polystyrene, polypropylene, polycarbonate, polyethylene terephthalate and polyethylene.

20. The method according to claim 1, wherein the welding filler is fed in the form of granulate to at least one nozzle.

21. The method according to claim 1, wherein the welding filler is supplied in the form of a continuous strand to the at least one nozzle.

22. A plastic container which is at least partially constructed from a thermoplastic material, comprising at least one first compartment element and at least one second compartment element which is thermoplastically welded to the first in a joining region, wherein the plastic container is made from a method which includes the following method steps:
  a) providing of at least the first and the second compartment element, which each comprise a plate element with at least one joining zone of a thermoplastic material comprising outer edges of the compartment element, wherein at least the second compartment element comprises a side wall arranged around an outer periphery of the plate element and having in each case a distal first and a proximal second outer edge,
  b) joining together of the at least two compartment elements such that the thermoplastic material joining zones contact each other and one outer edge of the first compartment element fully abuts the first outer edge of the second compartment element and a full butt joint is formed between the two compartment elements,
  c) welding of the at least two compartment elements by means of at least one temperature-regulated nozzle, wherein the at least one nozzle is guided around a periphery of the butt joint while in contact with the butt joint or the butt joint is guided alongside the at least one nozzle that is in contact with the at least one nozzle, wherein the first and second outer edges of the compartment elements are plasticized in the process and plasticized welding filler is simultaneously transferred to the butt joint so that a weld seam is formed between the two compartment elements, and
  d) obtaining a plastic container, wherein the at least two compartment elements are welded to one another.

* * * * *